(12) United States Patent
Ho et al.

(10) Patent No.: US 11,733,746 B2
(45) Date of Patent: Aug. 22, 2023

(54) PLATES TO RETAIN POWER BRICKS

(71) Applicant: Hewlett-Packard Development Company, L.P., Spring, TX (US)

(72) Inventors: Chin-Chang Ho, Taipei (TW); Hung-Ming Lin, Taipei (TW); Hong-Tao Hsieh, Taipei (TW); Che-An Yao, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/442,921

(22) PCT Filed: Jul. 24, 2019

(86) PCT No.: PCT/US2019/043234
§ 371 (c)(1),
(2) Date: Sep. 24, 2021

(87) PCT Pub. No.: WO2021/015758
PCT Pub. Date: Jan. 28, 2021

(65) Prior Publication Data
US 2022/0179464 A1    Jun. 9, 2022

(51) Int. Cl.
*G06F 1/18* (2006.01)
(52) U.S. Cl.
CPC .................... *G06F 1/188* (2013.01)
(58) Field of Classification Search
CPC .......................................................... G06F 1/18
See application file for complete search history.

(56) References Cited

U.S. PATENT DOCUMENTS

| 6,247,767 | B1  | 6/2001 | Liu et al. |
| 7,200,004 | B2  | 4/2007 | Chen et al. |
| 8,164,907 | B2  | 4/2012 | Hannula et al. |
| 9,228,693 | B2  | 1/2016 | Ditges et al. |
| 10,401,923 | B2* | 9/2019 | Chuang .................. G06F 1/189 |
| 2011/0173805 | A1* | 7/2011 | Richet .................. G11B 33/123 29/760 |

FOREIGN PATENT DOCUMENTS

KR         200308533 Y1     3/2003

OTHER PUBLICATIONS

HIDEit Mounts, HIDEit Uni-PB | Universal Power Brick Wall Mount, https://hideitmounts.com/products/powerbrickmount, retreived May 17, 2019, 1 page.
Pedaltrain, PT-VDL-MK Installation Guide, retreived May 17, 2019, 1 page https://help.pedaltrain.com/hc/en-us/article_attachments/360002793953/Bracket-Instructions-PT-VDL-MK.png.

* cited by examiner

*Primary Examiner* — Jerry Wu
(74) *Attorney, Agent, or Firm* — Quarles & Brady LLP

(57) ABSTRACT

An example apparatus to retain a computer power brick in a power brick holder includes a plate and a positioning mechanism removably attached at any of a plurality of positions on the plate. The positioning mechanism is attached at a preset position on the plate based on a size of the power brick.

12 Claims, 10 Drawing Sheets

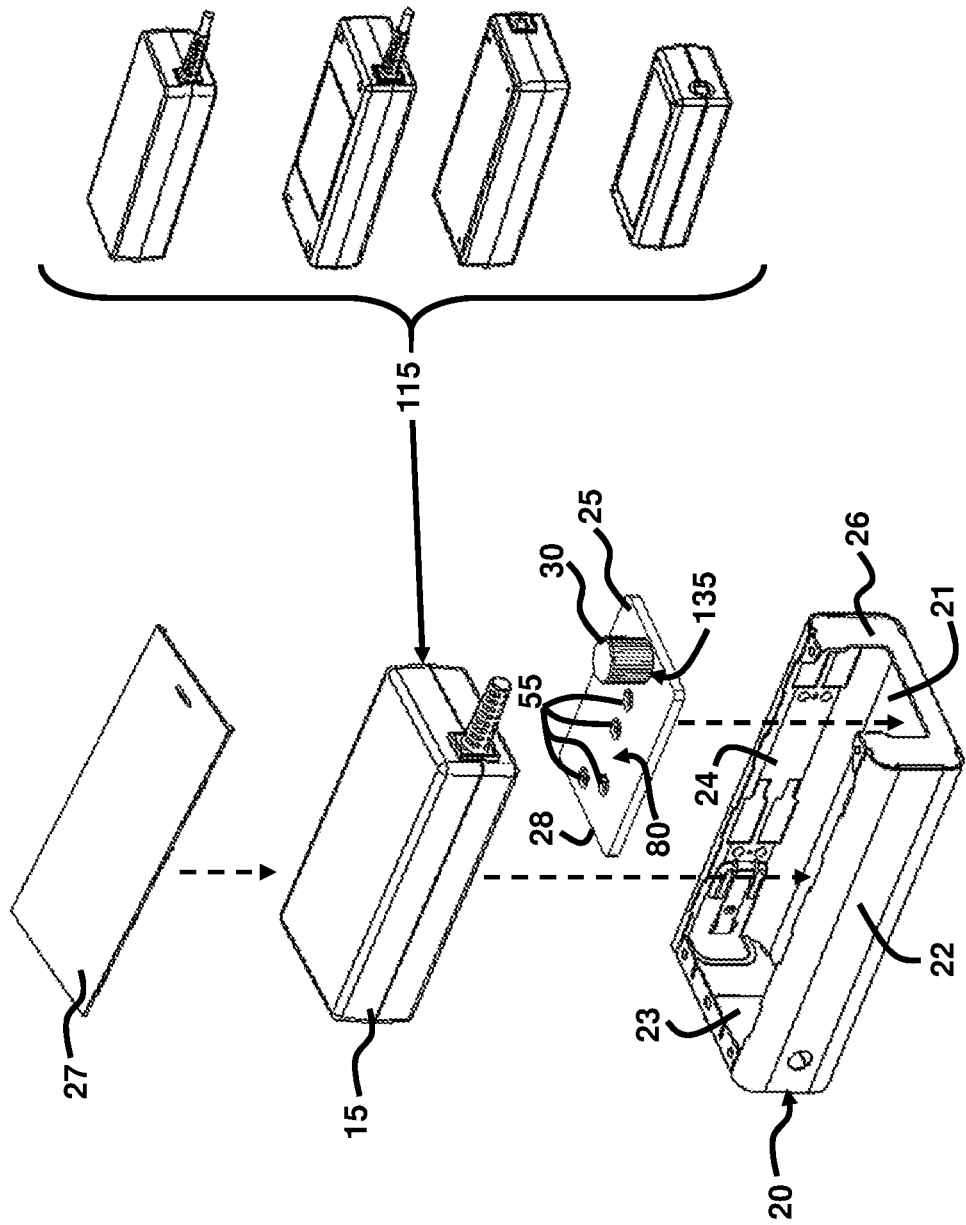

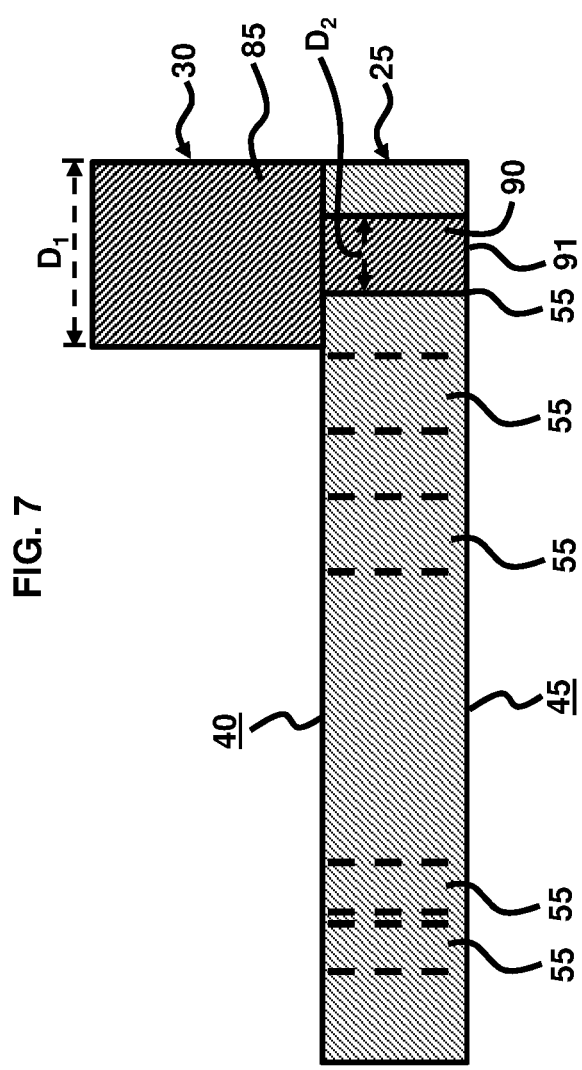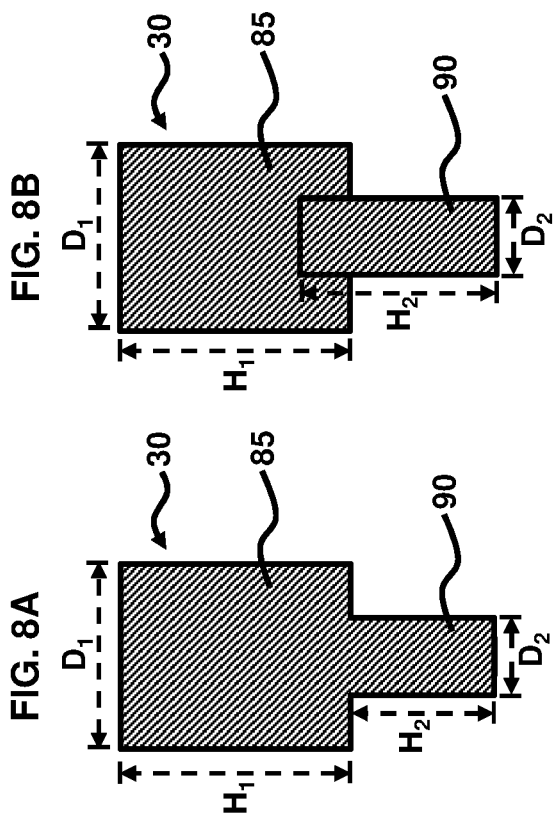

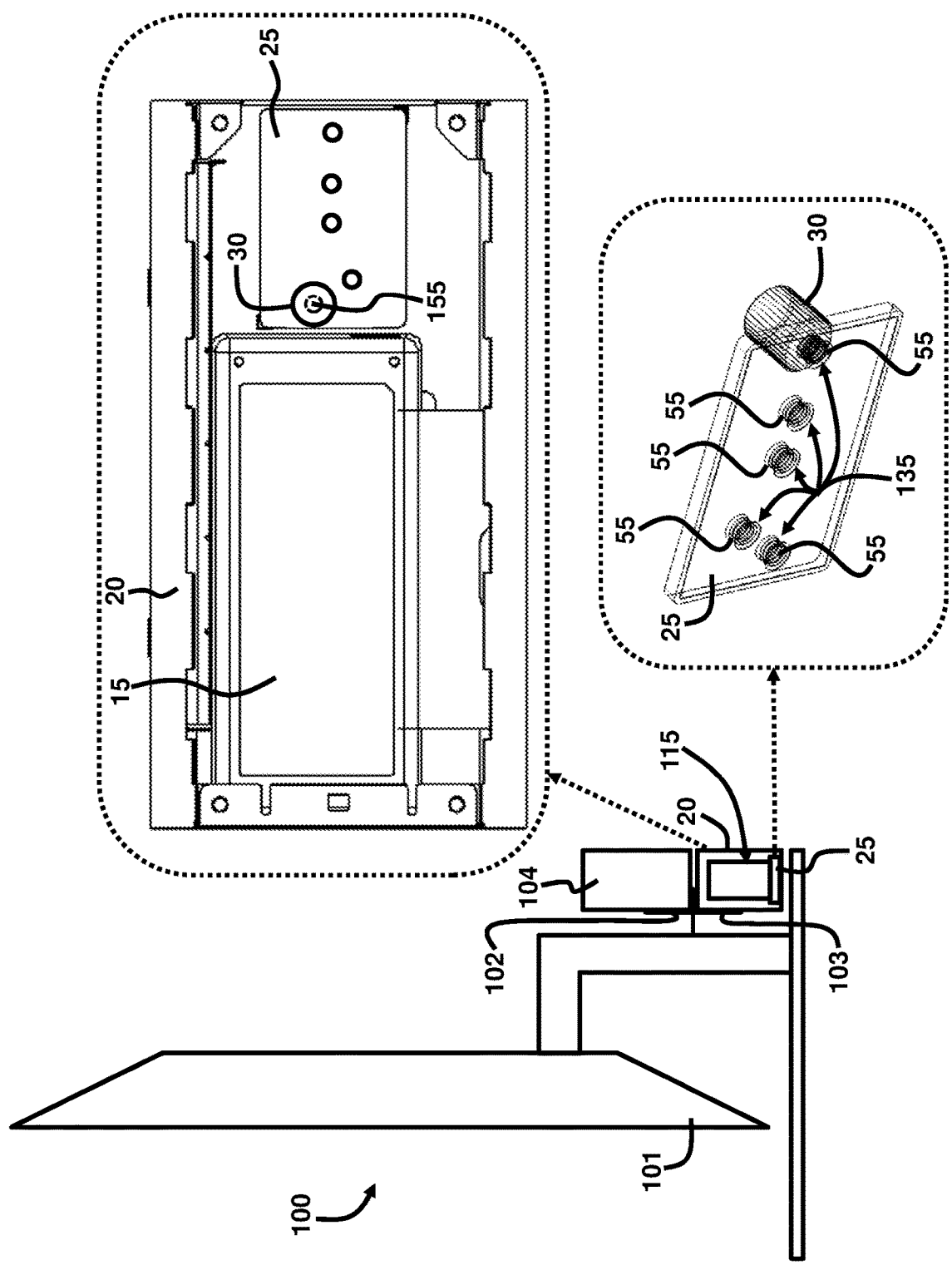

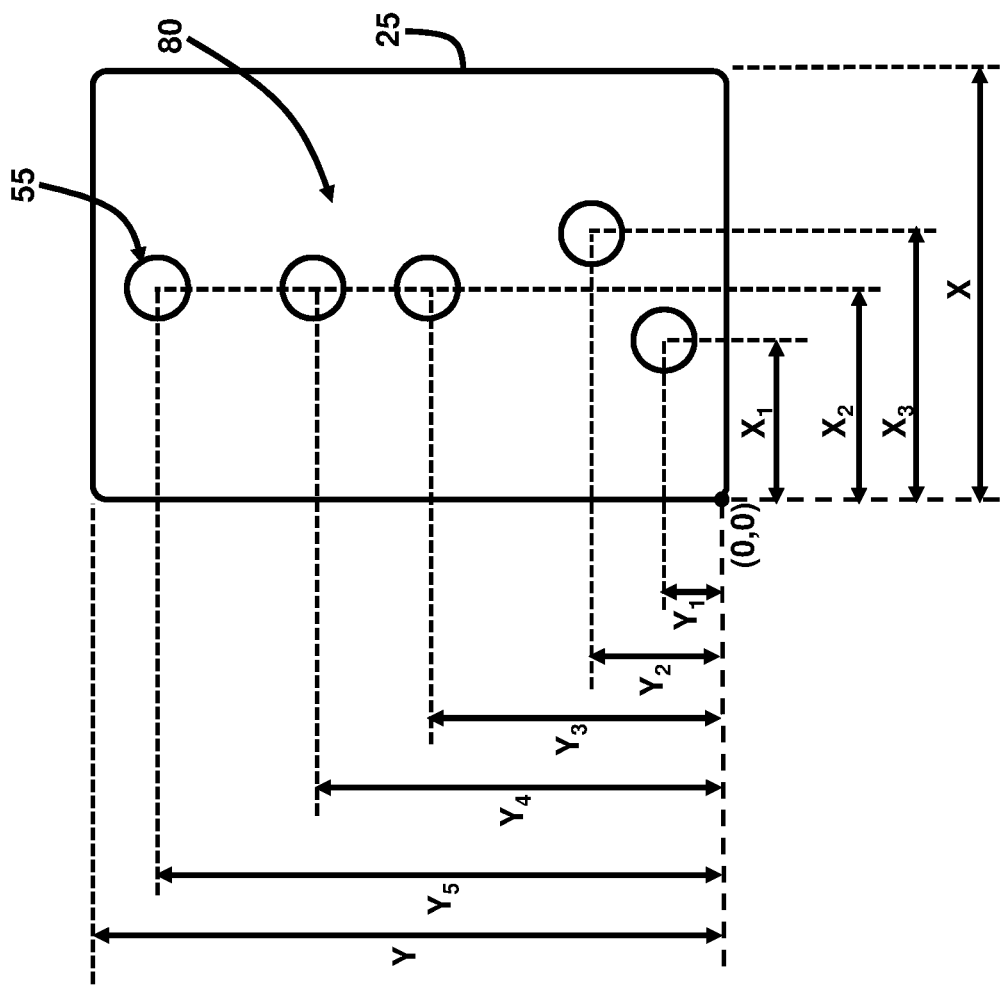

PLATES TO RETAIN POWER BRICKS

BACKGROUND

Computers may contain power bricks, which are similar to power supply devices or adapters used to power the computer. In use, these power bricks may generate considerable heat. After prolonged use, the increased heat levels may result in a reduced life of the power brick.

BRIEF DESCRIPTION OF THE DRAWINGS

The following detailed description references the drawings, in which:

FIG. 6 is a schematic diagram illustrating the apparatus of FIG. 5 showing an arrangement of the holes of a plate in a pattern, according to an example.

FIG. 7 is a schematic diagram illustrating the apparatus of FIG. 6 showing the positioning mechanism, according to an example.

FIG. 8A is a schematic diagram illustrating the apparatus of FIG. 7 showing an aspect of the positioning mechanism, according to an example.

FIG. 8B is a schematic diagram illustrating the apparatus of FIG. 7 showing an aspect of the positioning mechanism, according to another example.

FIG. 9 is a schematic diagram illustrating a computing device, according to an example.

FIG. 12 is a schematic diagram illustrating the plate of the computing device of FIG. 9 showing relative hole placement with respect to a reference point, according to an example.

Figure 1:
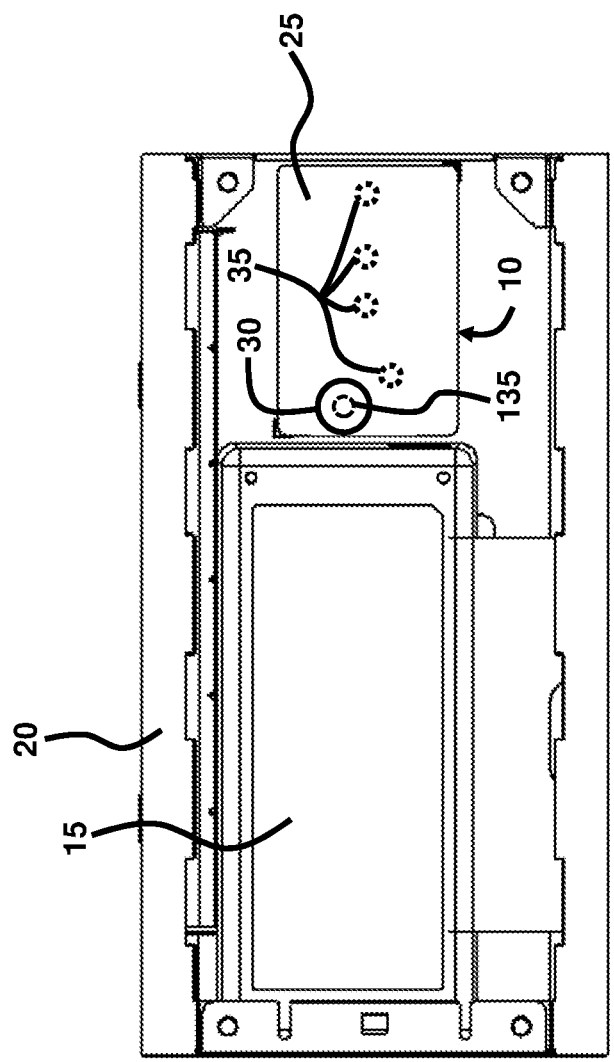
FIG. 1 is a schematic diagram of an apparatus to retain a computer power brick in a power brick holder, according to an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Power supply holders are specifically customized to a specific power supply device, reducing the possibility to leverage the ability for the power supply holders to accommodate power supply devices; i.e., power bricks, of different sizes, thereby increasing the overall cost and complexity of computer systems. Furthermore, a common attribute of most power bricks is that these devices generate significant amounts of heat during use. During extended use, the amount of heat can degrade the utility of useful life of the power bricks. Typically, power bricks dissipate heat regardless of the position of the power bricks, which causes an unsteady heat dissipation process and significant heat dissipation levels based on the size and power attributes of the particular power brick. Because power supply holders are generally standard components of uniform size regardless of the size of the corresponding power brick, the heat that is dissipated from the power bricks varies from size-to-size of the power bricks.

According to some examples, a plate and adjustable screw mechanism is provided to retain the position of a power brick inside a power brick holder. The plate contains multiple holes to permit the screw to be positioned in any of the holes. The position of the screw may be adjusted to different positions on the plate in order to accommodate multiple sizes of power bricks without having to change the plate during use. The plate is adhered to the inside of the power brick holder where a power brick is retained. The screw is positioned in a suitable hole to retain the power brick in place thereby ensuring the power brick does not slide out of the optimal position within the power brick holder. This retention of the power brick in place also permits the power brick to dissipate heat in an optimal manner.

An example provides an apparatus to retain a computer power brick in a power brick holder, the apparatus comprising a plate and a positioning mechanism removably attached at any of a plurality of positions on the plate. The positioning mechanism is attached at a preset position on the plate based on a size of the power brick. The plate may comprise a first surface and a second surface comprising adhesive material to attach to the power brick holder. The plate may comprise holes arranged at the plurality of positions to engage the positioning mechanism. The positioning mechanism may comprise a screw that is removably engaged with the plate in the holes. The positioning mechanism may comprise a push pin that is removably engaged with the plate in the holes.

Another example provides an apparatus to retain a position of a power brick of a computing device, the apparatus comprising a plate; a plurality of holes arranged in preset positions in the plate; and a positioning mechanism attached to the plate in any of the plurality of holes. The positioning mechanism is fastened in any of the plurality of holes based on a size of the power brick of the computing device. The preset positions of the plurality of holes may be arranged in a pattern in the plate, and the pattern may be selected to retain power bricks of various sizes in position based on fastening the positioning mechanism in any of the plurality of holes. The positioning mechanism may comprise an upper portion extending above the plate and having a first diameter; and a lower portion engaging any of the plurality of holes and having a second diameter smaller than the first diameter. The upper portion and the lower portion may be structurally continuous. The upper portion and the lower portion may comprise distinct and separate structures that are operatively connected together.

Another example provides a computing device comprising a power brick holder to accommodate power bricks of various sizes; a plate attached to the power brick holder; a plurality of holes arranged in preset positions in the plate;

and a positioning mechanism positioned in any of the plurality of holes to retain a position of a power brick in the power brick holder. The positioning mechanism is positioned in a predetermined hole based on a configuration of the power brick. At least some of the plurality of holes may be linearly arranged along a longitudinal axis of the plate. At least one of the plurality of holes may be offset from the longitudinal axis of the plate. The plurality of holes may be threaded to engage complementary threads of the positioning mechanism. The preset positions of the plurality of holes may permit the power brick to dissipate heat at a preset level.

FIG. 1 is a schematic diagram of an apparatus 10 to retain a computer power brick 15 in a power brick holder 20. The apparatus 10 comprises a plate 25 and a positioning mechanism 30 removably attached at any of a plurality of positions 35 on the plate 25. The plate 25 may be any type of mechanism that can fit substantially flush against the inner part of a power brick holder 20. The plate 25 may be arranged in any suitable size and configuration. In a non-limiting example, the plate 25 may be made of metal although any metal alloy may be used long so long as it can accommodate the weight of a power brick 15 placed thereon. Some example metal alloys may include cold rolled carbon steel such as SPCC, SGCC, and SECC as well as stainless steel, aluminum, or other metal materials. Additionally, the plate 25 may comprise any suitable size, length, width, thickness, curvature, and diameter, etc. In a non-limiting example, the plate 25 may be substantially rectangular in shape to match a corresponding substantially rectangular shape of the power brick 15 and power brick holder 20. In an example, the plate 25 may be approximately 48×32×2.5 mm (length, width, height/thickness), although other dimensions are possible. Moreover, the plate 25 may comprise a single body component or may comprise multiple components connected together. The plate 25 may comprise substantially flat surfaces or may comprise slightly raised surface ridges, which may aid in the heat dissipation of the power brick 15 constrained thereon.

The positioning mechanism 30 can be removably attached to the plate 25 by user manipulation. The positioning mechanism 30 is a separate component from the plate 25 and may comprise the same type of material; e.g., metal or metal alloy, as the plate 25 or the positioning mechanism 30 may comprise a different type of material from the plate 25. The positioning mechanism 30 may have any suitable size, configuration, and shape so long as it is constrained in the power brick holder 20 once the apparatus 10 is positioned in the power brick holder 20. For example, the positioning mechanism 30 may comprise a substantially cylindrical shape having a size suitable for manipulation by a user's fingers and without the need for any specialized mechanism or equipment for engagement. The positioning mechanism 30 may be attached and removed multiple times to/from the plate 25 at any of the plurality of positions 35 on the plate 25. In some examples, the positioning mechanism 30 may be attached to the plate 25 using mechanical attachment mechanisms including structural mechanisms or adhesive materials. In another example, the positioning mechanism 30 may be attached to the plate 25 through magnetic attachment such that the positioning mechanism 30 and plate 25 comprise complementary magnetic properties to permit magnetic attachment therebetween.

The plurality of positions 35 may be preset onto the plate 25 during the manufacturing process of the plate 25 such that the plurality of positions 35 may be spaced apart on the plate 25. The number of plurality of positions 35 is not limited to any particular number, and the size of each of the plurality of positions 35 is also not limited to any particular size. Nonetheless, the size of each of the plurality of positions 35 on the plate 25 may be substantially the same as the size of the positioning mechanism 30. In this regard, if the plurality of positions 35 are each substantially circular in shape, and the positioning mechanism 30 is substantially cylindrical in shape, then the size of each of the plurality of positions 35 may substantially align with the circumference of the positioning mechanism 30, for example. However, other shapes and configurations of the plurality of positions 35 are possible. The arrangement of the plurality of positions 35 may be selected to provide optimal heat dissipation properties of the power brick 15 positioned on the plate 25. In this regard, the positioning mechanism 30 is attached at a preset position 135 on the plate 25 based on a size of the power brick 15. Because the power brick 15 may comprise different sizes and shapes based on the different manufacturers producing different types of power bricks, the attachment of the positioning mechanism 30 on the plate 25 may be variably selected by a user to accommodate a power brick 15 irrespective of its size. Accordingly, the positioning mechanism 30 is attached at the preset position 135, which is located at any of the plurality of positions 35 on the plate, in order to constrain the movement of the power brick 15 placed in the power brick holder 20 containing the apparatus 10, which includes the plate 25 and positioning mechanism 30.

In an example, the user may be the manufacturer that positions the power brick 15 and plate 25 in the power brick holder 20 and selects the optimal preset position 135 to attach the positioning mechanism 30 in order to constrain or otherwise hold the power brick 15 in place in the power brick holder 20. In this regard, the positioning mechanism 30 does not have to necessarily contact power brick 15, but may provide some minimal movement; i.e., on the order of a few millimeters, for the power brick 15. In another example, the positioning mechanism 30 may directly abut the power brick 15 so as to prevent any movement of the power brick 15. According to another example, the user may be an end-user of a computer system that may have to self-install the power brick 15 or replace the power brick 15, and as such, the end-user may removably attach the positioning mechanism 30 to the plate 25 at the suitable preset position 135 in which to properly constrain the power brick 15 in the power brick holder 20.

Figure 2:
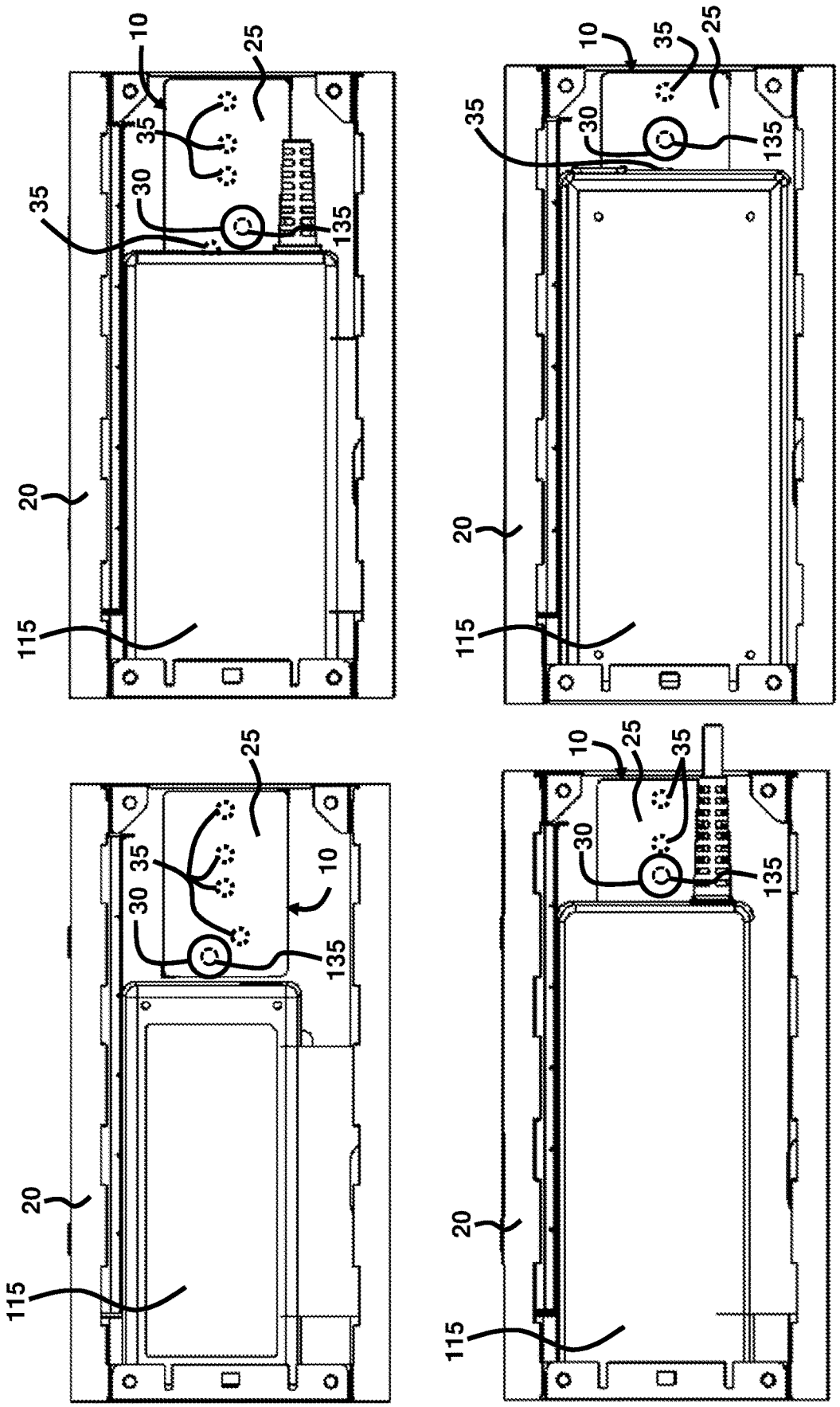
FIG. 2 is a schematic diagram of the apparatus of FIG. 1 implemented to retain power bricks of multiple sizes, according to an example.

FIG. 2, with reference to FIG. 1, illustrates the apparatus 10 implemented to retain power bricks 115 of different sizes. Accordingly, the power bricks 115 may comprise different lengths, widths, and heights, as well as different power parameters. While four different example power bricks 115 are shown in the drawings, any number of sizes and configurations of power bricks 115 may be accommodated by the apparatus 10. In accordance with the various examples herein, the terms relating to power brick 15 and multiple power bricks 115 may be used interchangeably herein. As shown in FIG. 2, the positioning mechanism 30 may be attached at a different preset position 135 on the plate 25 based on the size of the different power bricks 115. However, because the positioning mechanism 30 is removably attachable to the plate 25 at the plurality of positions 35, then if the power bricks 115 are replaced, the location of the positioning mechanism 30 on the plate 25 can be similarly adjusted. Furthermore, the arrangement of the plurality of positions 35 on the plate 25 are selected to ensure that there is no interference with the positioning mechanism 30 and any cord, plug, or other connected component of the power bricks 115.

Figure 3:
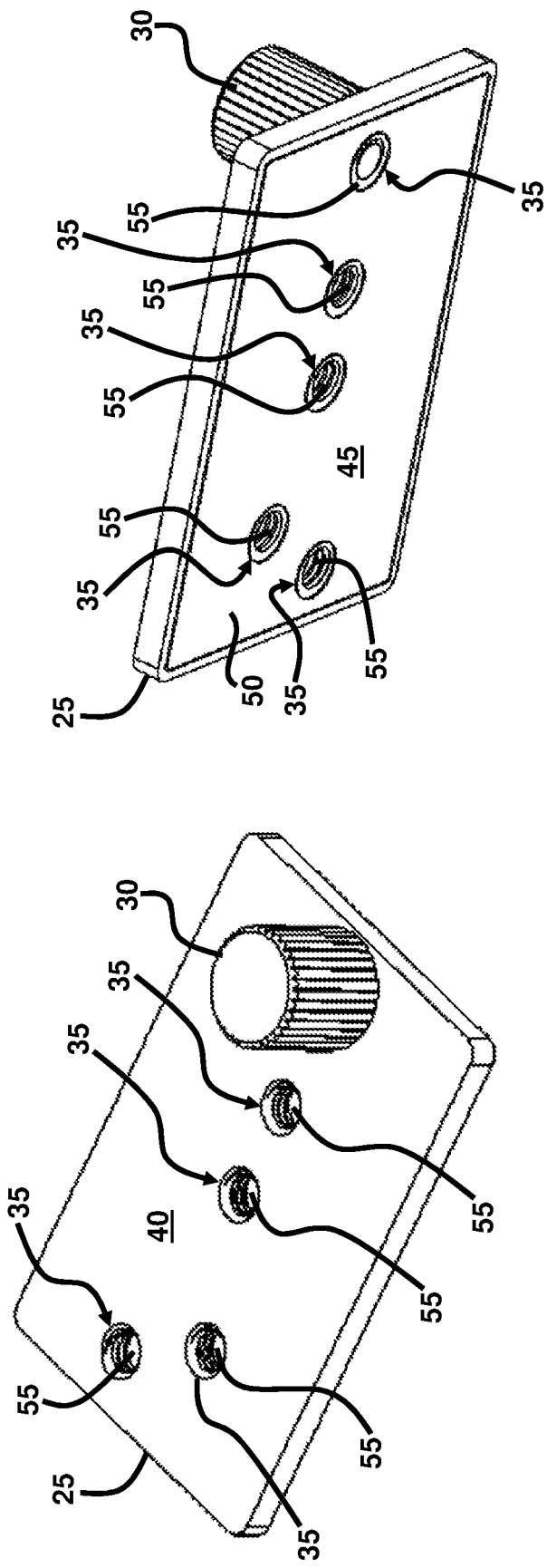
FIG. 3 is a schematic diagram illustrating the apparatus of FIG. 1 showing aspects of the plate, according to an example.

FIG. 3, with reference to FIGS. 1 and 2, shows that the plate 25 may comprise a first surface 40. Additionally, the plate 25 may comprise a second surface 45 comprising adhesive material 50 to attach to the power brick holder 20. The first surface 40 and second surface 45 are on opposite sides of the plate 25. In an example, the first surface 40 and the second surface 45 are substantially flat. In another example, any of the first surface 40 and the second surface 45 may comprise ridges and/or may be curved. The first surface 40 may be the surface that is visible from the open side of the power brick holder 20 and upon which part of the power brick 15 may reside thereon upon placement in the power brick holder 20. Moreover, the positioning mechanism 30 is generally removably attached to the plate 25 from the first surface 40. The second surface 45 containing the adhesive material 50, in an example, may be the surface that attaches or otherwise is in contact with the inside base surface of the power brick holder 20. In some examples, the plurality of positions 35 are viewable on both the first surface 40 and the second surface 45 such that the plurality of positions 35 are aligned on the first surface 40 and the second surface 45 and through the plate 25. The adhesive material 50 may comprise any suitable adhesive material that can firmly hold the plate 25 together with the power brick holder 20. For example, the adhesive material 50 may comprise glue; e.g., applied by a glue gun, etc., or industrial double-sided tape commonly used in the electronic industry. In other examples, the adhesive material 50 may be a magnetized film adhered to the second surface 45 of the plate 25, which magnetically attaches to the power brick holder 20. In another example, the second surface 45 may not necessarily comprise any adhesive material 50, and the plate 25 may be secured to the power brick holder 20 through other retention mechanisms such as screws, bolts, rivets, nails, or other types of fasteners or may be secured through soldering, etc.

In some examples, the plate 25 may comprise holes 55 arranged at the plurality of positions 35 to engage the positioning mechanism 30. In this regard, the plurality of positions 35 may comprise the holes 55 themselves such that the plurality of positions 35 are the holes 55. Accordingly, the holes 55 may be arranged in a preset position 135 and are not restricted to any particular number of holes 55. In an example, the holes 55 may comprise thru-holes that extend through the entire thickness of the plate 25 from the first surface 40 to the second surface 45. In another example, the holes 55 may not necessarily extend through the entire thickness of the plate 25 and may be bored in the first surface 40 and terminate prior to reaching the second surface 45. At least a portion of the positioning mechanism 30 may extend in the holes 55 for engagement of the positioning mechanism 30 to the plate 25. The holes 55 may be configured in any suitable size and may be threaded or unthreaded, according to some examples. In an example, the holes 55 may be uniformly configured such that the holes 55 are the same type of hole as one another. In another example, the holes 55 are not uniformly configured such that the holes 55 may be different from one another; e.g., some of the holes 55 may be thru-holes while others are not thru-holes, etc.

Figure 4B:
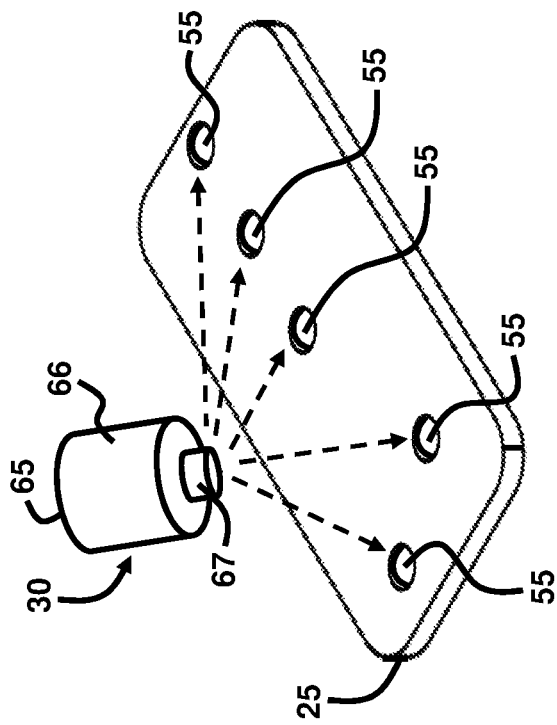
FIG. 4B is a schematic diagram illustrating the apparatus of FIG. 1 showing the positioning mechanism, according to another example.
Figure 4A:
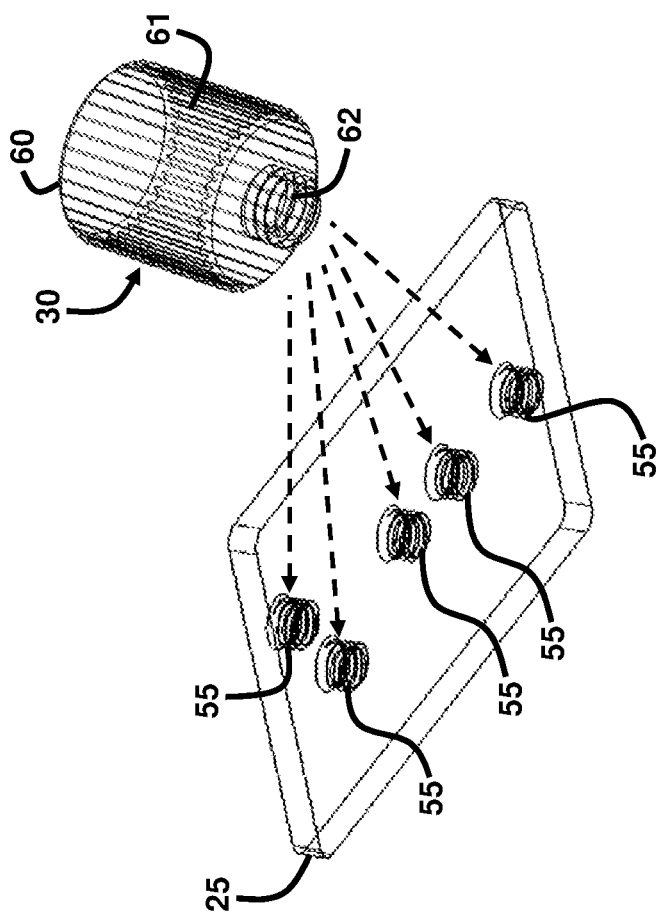
FIG. 4A is a schematic diagram illustrating the apparatus of FIG. 1 showing the positioning mechanism, according to an example.

FIG. 4A, with reference to FIGS. 1 through 3, shows that the positioning mechanism 30 may comprise a screw 60 that is removably engaged with the plate 25 in the holes 55. In this example, each of the holes 55 may be threaded to engage the screw 60. The screw 60 may be a captive screw to permit the attachment, removal, reattachment, re-removal, etc. of the screw 60 to/from the plate 25 and at different holes 55, or at the same hole. In an example, the screw 60 may comprise a ridged body portion 61 to permit ease of engagement with a user's fingers, and a threaded stem portion 62 to engage the holes 55 in the plate 25. In another example, the body portion 61 may not contain any ridges and may be substantially smooth.

FIG. 4B, with reference to FIGS. 1 through 4A, shows that the positioning mechanism 30 may comprise a push pin 65 that is removably engaged with the plate 25 in the holes 55. In this example, each of the holes 55 may be unthreaded to engage the push pin 65. The push pin 65 may have any suitable configuration to permit the attachment, removal, reattachment, re-removal, etc. of the push pin 65 to/from the plate 25 and at different holes 55, or at the same hole. In an example, the push pin 65 may comprise a substantially smooth body portion 66 to permit ease of engagement with a user's fingers, and a substantially smooth stem portion 67 to engage the unthreaded holes 55 in the plate 25. In another example, any of the body portion 66 and the stem portion 67 may contain ridges. For example, ridges on the stem portion 67 may facilitate an enhanced engagement and retention of the stem portion 67 in the holes 55, which may improve the strength of attachment of the push pin 65 to the plate 25.

Figure 5:
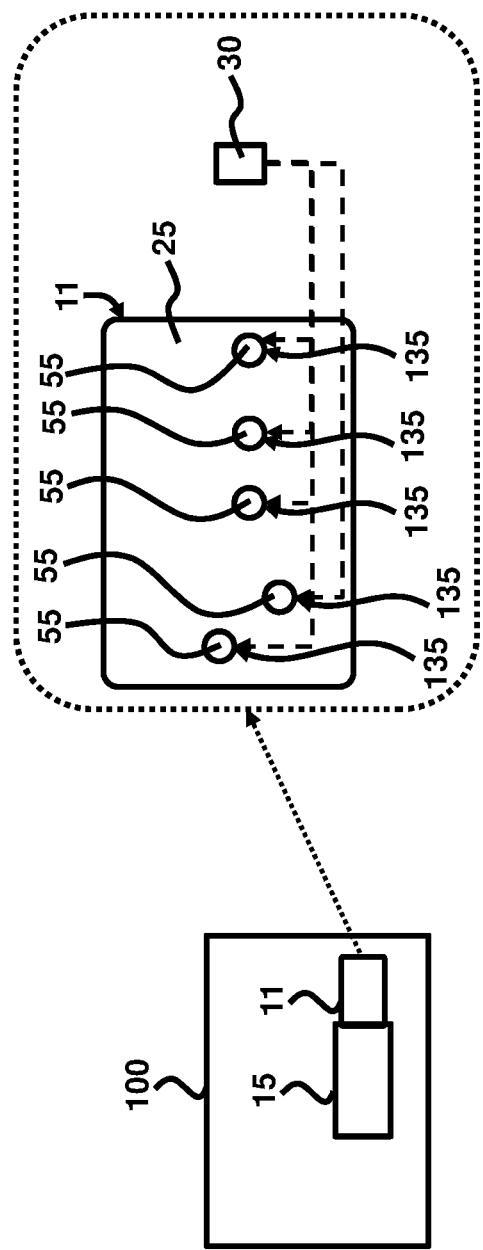
FIG. 5 is a schematic diagram illustrating an apparatus to retain a position of a power brick of a computing device, according to an example.

FIG. 5, with reference to FIGS. 1 through 4B, illustrates an apparatus 11 to retain a position of a power brick 15 of a computing device 100. The computing device 100 may be any type of computer such as a desktop mini personal computer containing a display screen or monitor, for example. In an example, the apparatus 11 may be similar to the apparatus 10 described above. The apparatus 11 comprises a plate 25, a plurality of holes 55 arranged in preset positions 135 in the plate 25, and a positioning mechanism 30 attached to the plate 25 in any of the plurality of holes 55. The positioning mechanism 30 is fastened in any of the plurality of holes 55 based on a size of the power brick 15 of the computing device 100. The fastening of the positioning mechanism 30 in any of the plurality of holes 55 may occur using mechanical and/or magnetic engagement mechanisms or materials, according to some examples.

According to an example, a positioning mechanism 30 is used for fixing the position of the power brick 15 in place such that the positioning mechanism 30 may be selectively positioned in any of the preset positions 135, which correspond to the holes 55 in the plate 25. The holes 55 may be thru-holes in an example. However, the holes 55 are not necessarily restricted to being thru-holes. The plate 25 may be smaller in size than the power brick 15 such that the plate 25, and the overall apparatus 11, offers a small footprint with respect to the computing device 100. Moreover, the plate 25, which may be composed of metal, may be substantially lightweight; e.g., approximately 10-35 g, for example, depending on the type of metal.

The preset positions 135 of the holes 55 in the plate 25 are selected based on the optimal heat dissipation that results when the power brick 15 is positioned adjacent to the plate 25 and the computing device 100 is turned on, thereby causing the power brick 15 to generate power and correspondingly generate heat. Depending on the size and/or type of the power brick 15, the amount of heat that is generated by the power brick 15 may change from size-to-size of the power brick 15 as well as power levels associated with the power brick 15. The preset positions 135 of the holes 55 permit the power brick 15 to be suitably positioned with respect to the plate 25 to cause the optimal amount of heat to be dissipated from the power brick 15, which helps in the ventilation of the power brick 15, and thereby the computing device 100, and reducing the damage to the power brick 15 itself.

FIG. 6, with reference to FIGS. 1 through 5, shows that the preset positions 135 of the plurality of holes 55 may be arranged in a pattern 80 in the plate 25, and the pattern 80 may be selected to retain power bricks 115 of various sizes in position in a power brick holder 20 based on fastening the positioning mechanism 30 in any of the plurality of holes 55. The pattern 80 is established by the preset positions 135 of the plurality of holes 55 upon manufacturing of the plate 25, and the positioning mechanism 30 may be selectively arranged in any of the preset positions 135 corresponding to the plurality of holes 55 by attachment/removal of the positioning mechanism 30 to/from the plate 25. Some example size and power level parameters associated with the power bricks 115 are provided in Table 1 below. The sizes and power levels are merely examples, and other sizes and power parameters associated with the power bricks 115 may be utilized for application to the apparatus 11, without restriction.

TABLE 1

Example Size and Power Parameters of Power Bricks

| Power (Watts) | Length (mm) | Width (mm) | Height (mm) |
|---|---|---|---|
| 65 | 126.00 | 50.00 | 30.00-31.25 |
| 90 | 132.50 | 57.00 | 30.30-31.55 |
| 65 | 108.00 | 46.00 | 29.50-30.50 |
| 90 | 134.00 | 58.00 | 31.10-32.60 |
| 65 | 113.46 | 54.96 | 30.00-31.00 |
| 90 | 135.65 | 52.30 | 30.60-31.35 |

In an example arrangement, the power brick 15 may be retained in a power brick holder 20. According to an example, power brick holder 20 may be a substantially hollow block having a lower base 21 with generally closed side walls 22, 23, 24 extending from three sides of the lower base 21 and a partially open side wall 26 extending from the fourth side of the lower base 21. While not shown in FIG. 6, the power brick holder 20 may also comprise brackets and springs to aid in the retention of the power bricks 15 in the power brick holder 20. A cover 27 may enclose the top of the power brick holder 20. The plate 25 may be attached to the lower base 21 of the power brick holder 20 and any of the power bricks 115 may also be positioned on the lower base 21 of the power brick holder 20 such that depending on the size of the power brick 15, at least a portion of the power brick 15 may extend on top of the plate 25 or may abut the edge 28 of the plate 25. The positioning mechanism 30 may be installed in any of the preset positions 135 of the plate 25 prior to the plate 25 being attached to the power bridge holder 20, or the positioning mechanism 30 may be installed in any of the preset positions 135 in the plate 25 once the plate 25 has been attached to the power bridge holder 20 and the power brick 15 has been inserted into the power bridge holder 20. The positioning mechanism 30 is installed in a particular preset position 135 based on the size of the power brick 15 to constrain the movement of the power brick 15 in the power brick holder 20.

FIG. 7, with reference to FIGS. 1 through 6, shows that the positioning mechanism 30 may comprise an upper portion 85 extending above the plate 25 and having a first diameter $D_1$. The positioning mechanism 30 may also comprise a lower portion 90 engaging any of the plurality of holes 55 and having a second diameter $D_2$ smaller than the first diameter $D_1$. In the context of the examples herein, the first diameter $D_1$ and the second diameter $D_2$ may correspond to circular arrangements of the upper portion 85 and lower portion 90 of the positioning mechanism 30. However, configurations other than circular configurations of the upper portion 85 and lower portion 90 may be possible and accordingly the first diameter $D_1$ and the second diameter $D_2$ may refer to thicknesses or widths associated with the upper portion 85 and lower portion 90, respectively. The second diameter $D_2$ of the lower portion 90 is slightly smaller than the corresponding diameters of the holes 55 in order for the holes 55 to accommodate the lower portion 90 of the positioning mechanism 30. The plate 25 may comprise a first surface 40 and a second surface 45 such that the upper portion 85 of the positioning mechanism 30 is on top of the first surface 40 of the plate 25. The bottom surface 91 of the lower portion 90 may be flush to the second surface 45 of the plate 25, in an example. In another example, the bottom surface 91 of the lower portion 90 of the positioning mechanism 30 may not be flush to the second surface 45 of the plate 25 such that if the holes 55 are not thru-holes, then the bottom surface 91 of the lower portion 90 may terminate somewhere in between the first surface 40 and the second surface 45 of the plate 25. In the example shown in FIG. 7, the holes 55 are thru-holes, however, this is merely an example, and the holes 55 are not restricted to being thru-holes.

FIG. 8A, with reference to FIGS. 1 through 7, shows that the upper portion 85 and the lower portion 90 may be structurally continuous. This permits the positioning mechanism 30 to be easily manufactured as one single mechanism, which reduces manufacturing costs. The upper portion 85 may comprise a first height $H_1$ and the lower portion 90 may comprise a second height $H_2$. The first height $H_1$ and the second height $H_2$ may be the same as one another or may be different from one another. Moreover, the first height $H_1$ may be the same as the first diameter $D_1$ or the first height $H_1$ may be different from the first diameter $D_1$. Furthermore, the second height $H_2$ may be the same as the second diameter $D_2$ or the second height $H_2$ may be different from the second diameter $D_2$.

FIG. 8B, with reference to FIGS. 1A through 8A, shows that the upper portion 85 and the lower portion 90 may comprise distinct and separate structures that are operatively connected together. In this example, the lower portion 90 may extend above the first surface 40 of the plate 25 to engage the upper portion 85. In other words, the second height $H_2$ of the lower portion 25 may be greater than the thickness of the plate 25. In other examples, the lower portion 90 may not extend above the first surface 40 of the plate 25, and may be substantially confined by the thickness/height of the plate 25. In an example, each of the holes 55 may comprise a lower portion 90 of the positioning mechanism 30 preset in place in the holes 55 and based on the size of the power brick 15, and the upper portion 90 of the positioning mechanism 30 may engage a lower portion 90 at the desired preset position 135 in order to suitably retain the power brick 15 in place in the power brick holder 20.

FIG. 9, with reference to FIGS. 1 through 8B, illustrates a computing device 100 comprising a power brick holder 20 to accommodate power bricks 115 of various sizes, a plate 25 attached to the power brick holder 20, a plurality of holes 55 arranged in preset positions 135 in the plate 25, and a positioning mechanism 30 positioned in any of the plurality of holes 55 to retain a position of a power brick 15 in the power brick holder 20. In an example, the computing device 100 may comprise a display screen or monitor 101, a first bracket 102, a second bracket 103, and a computer case 104 that may house the computer processor, memory, and other computing components. According to an example, the first bracket 102 may retain the computer case 104 in position, and the second bracket 103 may retain the power brick holder 20 in position. The power brick holder 20 contains the power brick 15 such that the power brick holder 20 is configured to house power bricks 115 of different sizes. The power brick holder 20 further includes the plate 25 containing the positioning mechanism 30 for constraining the movement of the power brick 15 in the power brick holder 20. The positioning mechanism 30 is positioned in a predetermined hole 155 in the plate 25 based on a configuration; e.g., size, etc., of the power brick 15. The positioning mechanism 30 is removable from the plate 25 in order for the positioning mechanism 30 to be positioned wherever the predetermined hole 155 is located in the plate 25 for retaining a power brick 15 of a particular size or configuration.

Figure 10:
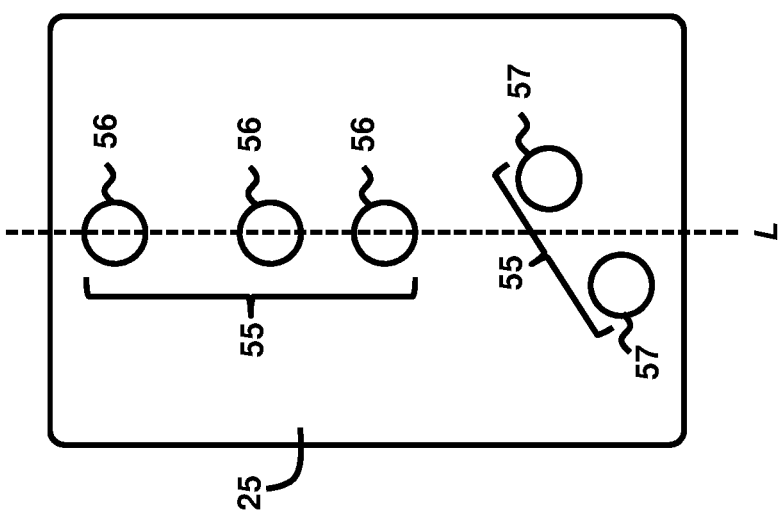
FIG. 10 is a schematic diagram illustrating the plate of the computing device of FIG. 9, according to an example.

FIG. 10, with reference to FIGS. 1 through 9, shows that at least some of the holes 56 of the plurality of holes 55 may be linearly arranged along a longitudinal axis L of the plate 25. The longitudinal axis L of the plate 25 may be defined by the axis associated with the longest lengthwise orientation of the plate 25. If the plate 25 is configured in a non-rectangular shape or without a distinct lengthwise orientation, then the longitudinal axis L of the plate 25 may be defined as the axis associated with the longest length associated with the plate 25 and/or associated with an axis that extends through at least two of the holes 56. In an example, the longitudinal axis L extends through the center of the plate 25. The holes 56 may be similarly arranged substantially in the center axis of the plate 25. The holes 56 may be spaced apart from one another in any suitable length. Additionally, the plurality of holes 55 may comprise any number of holes 56. Furthermore, at least one hole 57 of the plurality of holes 55 may be offset from the longitudinal axis L of the plate 25. In the context of the example shown in FIG. 10, the at least one hole 57 is offset from the longitudinal axis L by not being positioned on the longitudinal axis L. Moreover, the plurality of holes 55 may comprise any number of holes 57.

Figure 11:
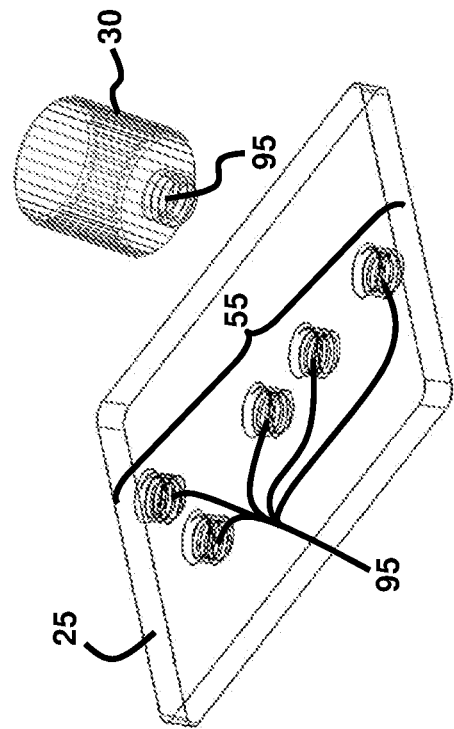
FIG. 11 is a schematic diagram illustrating the plate of the computing device of FIG. 9 showing aspects of the holes, according to an example.

FIG. 11, with reference to FIGS. 1 through 10 shows that the plurality of holes 55 may be threaded; e.g., with threads 95, to engage complementary threads 96 of the positioning mechanism 30. In this example, the positioning mechanism 30 comprises a captive screw configuration, although other types of screws may be possible. Furthermore, the plurality of holes 55 may be thru-holes or non-thru-holes. In FIG. 11, the plate 25 is shown in a transparent view to provide an indication of example positioning of the plurality of holes 55.

In accordance with the examples described herein, the preset positions 135 of the plurality of holes 55 may permit the power brick 15 to dissipate heat at a preset level. The preset level may be considered to be an optimal level for dissipating heat according to the type and/or size of power brick 15. In some examples, the optimal level for heat dissipation for a particular power brick 15 may be lower/higher than the heat dissipation for a different type of power brick 15. By constraining the movement of the power brick 15 by proper placement of the positioning mechanism 30 on or in the plate 25, the heat dissipation for the power brick 15 is enhanced compared to if the power brick 15 is not retained in position in the power brick holder 20 and is permitted to move out of position.

In an example, the pattern 80 of the plurality of holes 55 in the plate 25 creates the optimal heat dissipation associated with the power brick 15. FIG. 12, with reference to FIGS. 1 through 11 and Table 2 below describe some example dimensions associated with the plates 25 and the center(s) of the plurality of holes 55 such that the dimensions are provided in relation to a reference point (0,0) as provided in FIG. 12. The dimensions shown in Table 2 are merely examples to demonstrate how optimal heat dissipation may be achieved using the pattern 80 of the plurality of holes 55 for engagement of the positioning mechanism 30 in order to constrain the movement of the power brick 15, and accordingly other dimensions are possible with respect to the pattern 80 of the plurality of holes 55. Moreover, the dimensions shown in Table 2 describe the locations of the plurality of holes 55 for a plate 25 with the overall dimensions noted in order to generate the optimal heat dissipation for power bricks 115 of various sizes. Plates having other sizes and configurations may have different locations for the respective holes in order to create the optimal heat dissipation for power bricks 115 abutting those particular plates. Therefore, the dimensions shown in Table 2 are not meant to limit the scope of the disclosure described by the examples herein, as other dimensions are possible.

TABLE 2

Example Dimensions to Achieve Optimal Heat Dissipation

| Length | Dimenson (mm) |
|---|---|
| X | 32.0 |
| $X_1$ | 12.0 |
| $X_2$ | 16.0 |
| $X_3$ | 20.0 |
| Y | 48.0 |
| $Y_1$ | 5.0 |
| $Y_2$ | 10.5 |
| $Y_3$ | 23.0 |
| $Y_4$ | 31.5 |
| $Y_5$ | 43.0 |

The examples described herein provide an apparatus 10, 11 composed of a plate 25 that engages a positioning mechanism 30 at preset positions 135 in order to constrain or otherwise hold a power brick 15 in place in a power brick holder 20. By placing the positioning mechanism 30 at the preset positions 135 of the plate 25, the positioning mechanism 30 may suitably retain power bricks 115 of multiple sizes and/or types; e.g., with varying dimensions and power parameters due to different manufacturers or vendors, in place within the power brick holder 20. Power supply units and AC adapters; e.g., the power brick 15, are usually one of the first components to fail within a computer system due to the excessive heat that it generates while being used, and affixing the power brick 15 in place with the positioning mechanism 30 and plate 25 of the apparatus 10, 11 allows the power brick 15 to be located in an optimal position to dissipate heat, thereby prolonging the life of the power brick 15.

The present disclosure has been shown and described with reference to the foregoing implementations. Although specific examples have been illustrated and described herein it is manifestly intended that other forms, details, and examples may be made without departing from the scope of the disclosure that is defined in the following claims.

What is claimed is:

1. An apparatus to retain a power brick in a power brick holder, the apparatus comprising:
 a plate having holes that extend into preset positions of the plate; and a positioning mechanism configured to retain, when the positioning mechanism abuts an edge of the power brick, the power brick in the power brick holder, wherein:

the preset positions are arranged in a pattern that may retain power bricks of various sizes, some of the holes are linearly arranged along a longitudinal axis of the plate, one of the holes is offset from the longitudinal axis, and the positioning mechanism is removably insertable into any of the holes so as to permit, one of the preset positions, insertion of the positioning mechanism into the plate.

2. The apparatus of claim 1, wherein a surface of the plate comprises:

adhesive material that attaches the plate to the power brick holder.

3. The apparatus of claim 1, wherein the holes are arranged at the preset positions to engage the positioning mechanism.

4. The apparatus of claim 3, wherein the positioning mechanism comprises a screw that is configured to removably fasten the positioning mechanism to the plate at the one of the preset positions.

5. The apparatus of claim 3, wherein the positioning mechanism comprises a push pin that is configured to removably fasten the positioning mechanism to the plate at the one of the preset positions.

6. The apparatus of claim 1, wherein:

the pattern retains power bricks of various sizes in position based on fastening the positioning mechanism in said any of the holes.

7. The apparatus of claim 1, wherein the positioning mechanism comprises:

an upper portion extending above the plate and having a first diameter; and a lower portion engaging said any of the holes and having a second diameter smaller than the first diameter.

8. The apparatus of claim 7, wherein the upper portion and the lower portion are structurally continuous.

9. The apparatus of claim 7, wherein the upper portion and the lower portion comprise distinct and separate structures that are operatively connected together.

10. The apparatus of claim 1, wherein the holes are threaded to engage complementary threads of the positioning mechanism.

11. The apparatus of claim 1, wherein the holes permit the power brick to dissipate heat at a preset level.

12. A computing device comprising:

the apparatus of claim 1; and the power brick holder that is configured to accommodate power bricks of various sizes.

* * * * *